United States Patent
Braun

(10) Patent No.: US 10,399,570 B2
(45) Date of Patent: Sep. 3, 2019

(54) AUTONOMOUS DRIVING SYSTEM FOR A VEHICLE AND METHOD FOR PERFORMING THE OPERATION

(71) Applicant: Robert Bosch GmbH, Stuttgart (DE)

(72) Inventor: Volker Braun, Beilstein (DE)

(73) Assignee: Robert Bosch GmbH, Stuttgart (DE)

(*) Notice: Subject to any disclaimer, the term of this patent is extended or adjusted under 35 U.S.C. 154(b) by 21 days.

(21) Appl. No.: 15/513,067

(22) PCT Filed: Sep. 25, 2015

(86) PCT No.: PCT/EP2015/072071
§ 371 (c)(1),
(2) Date: Mar. 21, 2017

(87) PCT Pub. No.: WO2016/058804
PCT Pub. Date: Apr. 21, 2016

(65) Prior Publication Data
US 2017/0297578 A1    Oct. 19, 2017

(30) Foreign Application Priority Data
Oct. 14, 2014 (DE) .................. 10 2014 220 758

(51) Int. Cl.
*B60W 30/12* (2006.01)
*B60W 50/10* (2012.01)
(Continued)

(52) U.S. Cl.
CPC ...... *B60W 30/18163* (2013.01); *B60W 30/12* (2013.01); *B60W 50/10* (2013.01);
(Continued)

(58) Field of Classification Search
CPC .......... B60W 30/18; B60W 30/18163; B60W 10/06; B60W 2550/20; B60W 50/14;
(Continued)

(56) References Cited

U.S. PATENT DOCUMENTS 6,842,687 B2* 1/2005 Winner ............. B60K 31/0008
                                                180/169
7,979,174 B2* 7/2011 Fregene ............. B60W 30/16
                                                701/23
(Continued)

FOREIGN PATENT DOCUMENTS

CN    102227612 A    10/2011
CN    103620193 A    3/2014
(Continued)

OTHER PUBLICATIONS

International Search Report for PCT/EP2015/072071, dated Jan. 4, 2016.

*Primary Examiner* — Yonel Beaulieu
(74) *Attorney, Agent, or Firm* — Norton Rose Fulbright US LLP; Gerard Messina

(57) ABSTRACT

An autonomous driving system for a vehicle, including: a computer unit configured to evaluate surroundings-related and vehicle-related data using sensors and performs an autonomous driving operation based on the data, in which a driver command is initiated by an interaction of the driver and is implemented by the autonomous driving system if this is possible following an evaluation of the data. Also described is a related method.

6 Claims, 1 Drawing Sheet

(51) Int. Cl.
*B60W 50/12* (2012.01)
*B62D 15/00* (2006.01)
*B60W 30/18* (2012.01)
*B62D 15/02* (2006.01)

(52) U.S. Cl.
CPC ......... *B60W 50/12* (2013.01); *B62D 15/0255* (2013.01); *B60W 2540/04* (2013.01); *B60W 2540/18* (2013.01)

(58) Field of Classification Search
CPC ....... B60W 30/16; G01C 21/26; G01C 21/34; G01C 21/30; G01C 21/16
See application file for complete search history.

(56) References Cited

U.S. PATENT DOCUMENTS

| | | | | |
|---|---|---|---|---|
| 9,429,440 | B2* | 8/2016 | Harada | B60W 30/16 |
| 2010/0057321 | A1* | 3/2010 | Randler | B60W 30/16 |
| | | | | 701/96 |
| 2013/0002416 | A1 | 1/2013 | Gazit | |
| 2014/0172221 | A1* | 6/2014 | Solyom | B62D 15/0285 |
| | | | | 701/23 |
| 2015/0344033 | A1* | 12/2015 | Fukuda | B60W 30/16 |
| | | | | 701/117 |
| 2015/0353094 | A1* | 12/2015 | Harda | B60W 30/18163 |
| | | | | 701/23 |
| 2016/0059858 | A1* | 3/2016 | Heinrich | B60W 30/18163 |
| | | | | 701/23 |
| 2016/0107655 | A1* | 4/2016 | Desnoyer | B60W 50/14 |
| | | | | 701/23 |
| 2016/0139598 | A1* | 5/2016 | Ichikawa | B60W 30/09 |
| | | | | 701/25 |
| 2016/0161267 | A1* | 6/2016 | Harada | B60W 30/16 |
| | | | | 701/25 |
| 2017/0183007 | A1* | 6/2017 | Oh | B60W 30/16 |
| 2017/0248957 | A1* | 8/2017 | Delp | B60W 30/00 |

FOREIGN PATENT DOCUMENTS

| | | | |
|---|---|---|---|
| CN | 103661364 A | 3/2014 | |
| JP | 2003063273 A | 3/2003 | |
| JP | 2005165708 A | 6/2005 | |
| JP | 2013126793 A | 6/2013 | |
| WO | 2009/000619 A1 | 12/2008 | |
| WO | 2013/117323 A1 | 8/2013 | |
| WO | WO-2013117323 A1 * | 8/2013 | ......... B60W 50/082 |

* cited by examiner

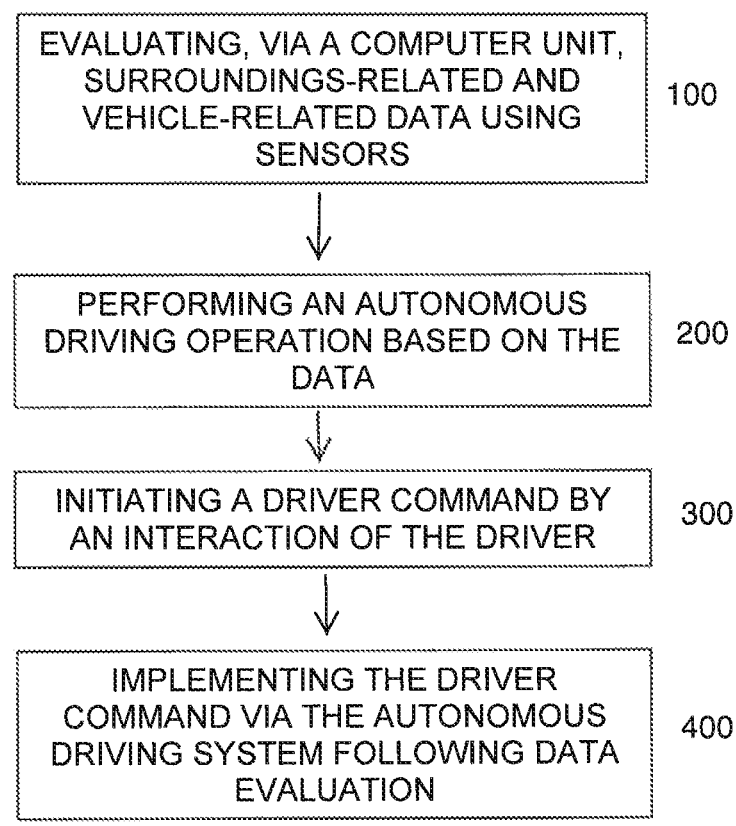

AUTONOMOUS DRIVING SYSTEM FOR A VEHICLE AND METHOD FOR PERFORMING THE OPERATION

FIELD OF THE INVENTION

The present invention relates to an autonomous driving system for a vehicle and to a method for performing the operation, including a computer unit, which evaluates surroundings-related and vehicle-related data using sensors and performs an autonomous driving operation on the basis of the data.

BACKGROUND INFORMATION

It is believed to be understood to provide autonomous driving systems for vehicles that observe the surroundings of the vehicle using sensors. In these driving systems, the vehicle either drives completely autonomously or the driver intervenes in certain situations such that the driver then retakes control over the vehicle completely. That is to say, either the motor vehicle is driving or the driver is driving. Both or a combination is not possible so far. Such autonomous driving systems have the disadvantage that a loss of control associated with autonomous driving may be experienced as unpleasant.

It is believed to be understood to provide autonomous driving systems for vehicles that observe the surroundings of the vehicle using sensors. In these driving systems, the vehicle either drives completely autonomously or the driver intervenes in certain situations such that the driver then retakes control over the vehicle completely. That is to say, either the motor vehicle is driving or the driver is driving. Both or a combination is not possible so far. Such autonomous driving systems have the disadvantage that a loss of control associated with autonomous driving may be experienced as unpleasant.

SUMMARY OF THE INVENTION

In order to improve the user-friendliness of the driving system for a vehicle, including a computer unit, which evaluates surroundings-related and vehicle-related data using sensors and performs an autonomous driving operation on the basis of the data, the invention provides for a driver command to be initiated by an interaction of the driver and to be accommodated by the autonomous driving system if this is possible following an evaluation of the data. The invention is provided as a supplement to existing autonomous driving systems.

In particular, the autonomous driving system for a vehicle of the present invention having the features described herein and the method for performing the operation as described herein have the advantage that in autonomous driving the driver stays at least under the impression of maintaining complete control over the vehicle such that the driver perceives no noticeable loss of control, which overall results in an improvement of the user-friendliness of the driving system. Advantageously, a positive sensation is also possible for vehicle drivers, in particular handicapped vehicle drivers, who due to their age or their lack of motivation are no longer able to drives so well or who as beginning drivers do not yet have the necessary experience.

Additional advantages and advantageous developments of the present invention are derived from the descriptions herein and the specification.

In one advantageous development, the interaction of the driver occurs by a steering-wheel motion, whereupon the vehicle changes the lane autonomously.

In one advantageous development, the lane change is followed by an autonomous passing operation of the vehicle.

In one advantageous development, the interaction of the driver occurs by a steering-wheel motion, whereupon a turn-off operation of the vehicle is initiated.

A particularly simple, safe and reliable driving system is achieved if the steering-wheel angle is read in and is filtered via at least one filter and a lane change or a turn-off operation is initiated only when greater steering angles are detected.

Exemplary embodiments of the present invention are explained in greater detail in the following description.

DETAILED DESCRIPTION

An autonomous driving system is configured to take the responsibility for driving the vehicle away from the driver as completely as possible. For this purpose, the autonomous driving system observes its surroundings using sensors and ascertains therefrom a model of the environment using surroundings-related and vehicle-related data, and autonomously determines necessary maneuvers of the vehicle. In certain critical situations, the driver is warned so that the driver retakes complete control over the vehicle. That is to say, either the motor vehicle is driving or the driver is driving. Both or a combination is to date not possible and is to be made possible by the present invention.

The driving system according to the present invention has the advantage that in autonomous driving operation the driver remains at least under the impression of maintaining complete control over the vehicle such that for the driver no loss of control is noticeable. Thus, a positive sensation is also possible for vehicle drivers, in particular handicapped vehicle drivers, who due to their age or their lack of motivation are no longer able to drives so well or who as beginning drivers do not yet have the necessary experience. These vehicle drivers are quasi left to believe in good faith that they always have the vehicle completely under control, while in the background the driving system always initiates all necessary steps to keep the vehicle safely in its lane for example.

According to the present invention, a driver command is initiated by an interaction of the driver and is accommodated immediately by the autonomous driving system if this is possible following an evaluation of the data. The data or the possibility of accommodating the driver command and initiating a specific driving maneuver is determined by information of the sensors and its evaluation in the computer unit. The driver indicates for example by a steering-wheel motion that he would now like to pass another vehicle, and the driving system checks autonomously with the aid of sensors, such as front radar sensors, front video camera as well as rear radar sensors, whether it is able to pass. This is followed by an automatic steering operation and an autonomously performed passing maneuver that are controlled by the driving system via the computer unit. For this purpose, smaller steering angles may be filtered out via filters provided in the computer unit and the lane may be maintained automatically.

Thus it is possible to read in the steering wheel angle in the computer unit and to filter it via at least one filter. The intention to drive straight ahead, to turn off or to perform a passing maneuver is detected with the aid of multiple corresponding filters. With the aid of the sensors installed in the vehicle, it is possible to detect or check via the computer unit whether based on the data a passing maneuver is possible, and this passing maneuver may then also be initiated.

The autonomous driving system according to the present invention represents an advantageous supplement to known autonomous driving systems.

What is claimed is:

1. An autonomous driving system for a vehicle, comprising:
   a computer unit configured to evaluate surroundings-related and vehicle-related data using sensors and performs an autonomous driving operation based on the data;
   wherein a driver command is initiated by an interaction of the driver and is implemented by the autonomous driving system if this is possible following an evaluation of the data, and
   wherein in the autonomous driving operation, the driver is at least under the impression of maintaining complete control over the vehicle such that no loss of control is noticeable for the driver.

2. The autonomous driving system of claim 1, wherein the interaction of the driver occurs by a steering-wheel motion, and wherein the vehicle changes lanes autonomously.

3. The autonomous driving system of claim 2, wherein, following the lane change, a passing operation of the vehicle is initiated autonomously.

4. The autonomous driving system of claim 1, wherein the interaction of the driver occurs by a steering-wheel motion, whereupon a turn-off operation of an autonomous operation of the vehicle is initiated.

5. The autonomous driving system of claim 1, wherein the steering-wheel angle is read in and is filtered via at least one filter and a lane-change or a turn-off operation of an autonomous operation of the vehicle is initiated only when greater steering angles are detected.

6. A method for providing autonomous driving via an autonomous driving system for a vehicle, the method comprising:
   evaluating, via a computer unit, surroundings-related and vehicle-related data using sensors and performs an autonomous driving operation based on the data;
   initiating a driver command by an interaction of the driver; and
   implementing the driver command via the autonomous driving system if this is possible following an evaluation of the data, and
   wherein in the autonomous driving operation, the driver is at least under the impression of maintaining complete control over the vehicle such that no loss of control is noticeable for the driver.

* * * * *